United States Patent [19]

Schoonover et al.

[11] Patent Number: 5,376,247
[45] Date of Patent: Dec. 27, 1994

[54] CONTROL OF CARBON BALANCE IN A SILICON SMELTING FURNACE BY MONITORING CALCIUM

[75] Inventors: David E. Schoonover, Springfield; Ronald F. Silver, Eugene; Martin D. Young, Springfield, all of Oreg.

[73] Assignee: Dow Corning Corporation, Midland, Mich.

[21] Appl. No.: 57,911

[22] Filed: May 7, 1993

[51] Int. Cl.$^5$ .......................... C01B 33/02; H05F 3/00
[52] U.S. Cl. ..................................... 204/164; 423/350
[58] Field of Search ..................... 423/350; 204/164

[56] References Cited

U.S. PATENT DOCUMENTS

| | | |
|---|---|---|
| 3,909,242 | 9/1975 | Skreien . |
| 4,539,194 | 9/1985 | Halvorsen . |
| 4,798,659 | 1/1989 | Dosaj et al. . |
| 4,898,960 | 2/1990 | Dosaj et al. . |
| 5,174,982 | 12/1992 | Dosaj et al. . |

*Primary Examiner*—Wayne Langel
*Attorney, Agent, or Firm*—William F. Boley

[57] ABSTRACT

The present invention is a method for controlling the carbon balance of a silicon smelting furnace. The inventors lave discovered that when the concentration of calcium within the silicon formed in the furnace is maintained within a range of about 0.4 to 2.0 weight percent, the calcium yield of the furnace is a rapid and sensitive indicator of the carbon balance of the furnace. More specifically, the inventors have found that a calcium yield of less than about 80 weight percent indicates a negative carbon balance in the furnace, a calcium yield of greater than about 90 weight percent indicates an excess carbon balance in the furnace, and a calcium yield within a range of about 80 weight percent to 90 weight percent indicates a furnace in carbon balance. In a preferred embodiment of the present invention, calcium yield is used in conjunction with a harmonic volts parameter and a electrode consumption measurement to control carbon balance of the furnace.

7 Claims, No Drawings

CONTROL OF CARBON BALANCE IN A SILICON SMELTING FURNACE BY MONITORING CALCIUM

BACKGROUND OF INVENTION

The present invention is a method for controlling the carbon balance of a silicon smelting furnace. The inventors have discovered that when the concentration of calcium within the silicon formed in the furnace is maintained within a range of about 0.4 to 2.0 weight percent, the calcium yield of the furnace is a rapid and sensitive indicator of the carbon balance of the furnace. More specifically, the inventors have found that a calcium yield of less than about 80 weight percent indicates a negative carbon balance in the furnace, a calcium yield of greater than about 90 weight percent indicates an excess carbon balance in the furnace, and a calcium yield within a range of about 80 weight percent to 90 weight percent indicates a furnace in carbon balance. In a preferred embodiment of the present invention, calcium yield is used in conjunction with a harmonic volts parameter and a electrode consumption measurement to control carbon balance of the furnace.

Elemental silicon is produced by the carbothermic reduction of silicon dioxide ($SiO_2$) according to the overall reaction:

$$SiO_2 + 2C \rightarrow Si + 2CO \qquad (1)$$

It is well known to those skilled in the art that this reaction proceeds through a number of intermediate reactions involving the production and reaction of silicon monoxide (SiO) and silicon carbide (SiC). Important intermediate reactions for the purpose of this invention can be summarized as: The reaction of silicon dioxide with carbon to form silicon carbide, $$SiO_2 + 3C \rightarrow SiC + 2CO, \qquad (2)$$

the reaction of silicon monoxide with carbon to form silicon carbide, $$SiO + 2C \rightarrow SiC + CO, \qquad (3)$$

and the reaction of silicon with carbon to form silicon carbide, $$Si + C \rightarrow SiC \qquad (4)$$

As equation (1) illustrates, theory suggests that for a silicon smelting furnace to be in carbon balance two moles of carbon should be added to the furnace per mole of silicon dioxide. This condition is described as 100 percent carbon theory. However, due to process inefficiencies, operation of a silicon smelting furnace does not proceed exclusively according to reaction (1).

If, for example there is insufficient or unreactive carbon, in bulk or locally, to effect reaction (3) a portion of the silicon monoxide will exit the charge bed in the offgas. This situation can occur due to raw materials selection, bed design, and unbalanced stoichiometry in the bed. The loss of silicon monoxide from the furnace results in reduced recovery of elemental silicon. In addition, in the case of insufficient carbon, increased consumption of carbon electrodes used in the furnace can occur. In extreme cases of carbon deficiency, carbon used as furnace lining may be consumed.

Conversely, if too much carbon is present in the furnace, in bulk or locally, reactions (2), (3), and (4) can cause silicon carbide accumulation and reduced silicon production. The accumulated silicon carbide can cause filling of the furnace causing the electrode to be raised out of the proper operating position. In addition, when excess silicon dioxide is added to react with the accumulated silicon carbide, the additional silicon monoxide formed can cause increased electrode consumption and loss of process yield of elemental silicon.

Therefore, it is important for efficient furnace operation that the furnace be kept in carbon balance. However, as a result of the described inefficiencies, carbon balance in a silicon smelting furnace cannot be maintained by merely adding carbon and silicon dioxide to the furnace in a two to one molar ratio, based on carbon theory.

Therefore, it is an objective of the present invention to provide a method where carbon balance of a silicon smelting furnace can be determined within a fairly short time period (e.g. four to eight hours) and adjustments made to carbon balance as needed. The benefits provided by the described method can include reduced electrode consumption, higher process yields, and less furnace shutdowns.

Dosaj et al., U. S. Pat. No. 5,174,982, issued Dec. 29, 1992, describes a method for assessing the carbon balance of a silicon smelting furnace by measuring the amount of carbon monoxide evolved in offgas exiting the furnace.

Halvorsen, U. S. Pat. No. 4,539,194, issued Sep. 3, 1985, describes adding one to ten percent calcium to silicon to facilitated subsequent purification steps.

Dosaj et al., U. S. Pat. No. 4,798,659, issued Jan. 17, 1989, describe an improvement to a process for the preparation of silicon from the reduction of silicon dioxide with a solid carbonaceous reducing agent. The improvement comprises feeding calcium compounds into the reaction zone of a silicon furnace and controlling and maintaining a desired calcium level in the reaction zone of the silicon furnace. Dosaj et al. teach that the calcium compounds may be fed to the silicon furnace as a constituent of either the silicon dioxide or solid carbonaceous reducing agent feeds, as a separate feed, or as a combination of two or more of these feeds.

The cited art does not recognize that calcium yield of a silicon smelting furnace can be used as an indicator of carbon balance within the furnace, thus allowing improved control of the carbon balance and resultant improvements in the furnace performance.

SUMMARY OF INVENTION

The present invention is a method for controlling the carbon balance of a silicon smelting furnace. The inventors have discovered that when the concentration of calcium within the silicon formed in the furnace is maintained within a range of about 0.4 to 2.0 weight percent, the calcium yield of the furnace is a rapid and sensitive indicator of the carbon balance of the furnace. More specifically, the inventors have found that a calcium yield of less than about 80 weight percent indicates a negative carbon balance in the furnace, a calcium yield of greater than about 90 weight percent indicates an excess carbon balance in the furnace, and a calcium yield within a range of about 80 weight percent to 90 weight percent indicates a furnace in carbon balance. In a preferred embodiment of the present invention, calcium yield is used in conjunction with a harmonic volts parameter and a electrode consumption measurement to control carbon balance of the furnace.

DESCRIPTION OF INVENTION

The present invention is a method for controlling the carbon balance of a silicon smelting furnace. The method comprises:
(A) providing to a furnace a mixture comprising silicon dioxide, a carbon source, and a calcium source,
(B) providing energy to the furnace to effect carbothermic reduction of the silicon dioxide to silicon,
(C) controlling calcium concentration within the silicon within a range of about 0.4 to 2.0 weight percent,
(D) recovering silicon from the furnace,
(E) determining yield of calcium in the recovered silicon to determine carbon balance of the furnace, where a calcium yield of less than about 80 weight percent indicates a negative carbon balance in the furnace, a calcium yield of greater than about 90 weight percent indicates an excess carbon balance in the furnace, and a calcium yield within a range of about 80 weight percent to 90 weight percent indicates a furnace in carbon balance, and
(F) adjusting carbon balance of the furnace based on the calcium yield.

The present invention is a method for controlling the carbon balance of a silicon smelting furnace. A mixture comprising silicon dioxide, a carbon source, and a calcium source is provided to the furnace. Energy is then provided to the furnace to effect the carbothermic reduction of the silicon dioxide. The energy can be provided to the furnace by known means, for example, a submerged-arc electrode or a transferred-arc plasma torch. The electricity used as the energy source can be direct current or single or multiphase alternating current. A preferred means for supplying energy to the furnace is by one or more submerged-arc carbon or graphite electrodes connected to an alternating current source.

The present invention comprises providing to a furnace a mixture comprising silicon dioxide, a carbon source, and a calcium source. The components comprising the mixture may be added to the furnace separately and in combination. Other additives may also be added to the furnace, for example phosphorous as described in Dosaj et al., U. S. Pat. No. 4,898,960 issued Feb. 6, 1990, and up to about two weight percent copper.

The silicon dioxide added to the furnace may be, for example, quartz in its many naturally occurring forms; and fused and fumed silica, precipitated silica, and silica flour in their many forms. The physical form of the silicon dioxide can be, for example powder, granule, chip, lump, pellet, flake, and briquette. Preferred is when the silicon dioxide is quartz.

The source of carbon which may be added to the furnace can be, for example, charcoal, coal, coke, wood chips, or mixtures thereof. The form of the carbon can be, for example, granule, chip, lump, pellet, flake, and briquette.

The calcium can be provided to the furnace from several sources. The calcium may be added as a constituent of the silicon dioxide or carbon source provided to the furnace or by a combination of these two feed materials. Silicon dioxide varies significantly in calcium content, depending upon the source of the silicon dioxide. As an example, it has been found that the calcium content of naturally occurring quartz used in the manufacture of silicon can vary in a range from about 0.003 to 5 weight percent. Correspondingly, the calcium content of the carbon source can vary significantly depending upon the source. An example of a carbon source with high calcium content is oak wood chips which can have a calcium content of between 0.2 to 0.4 weight percent. An example of a carbon source with low calcium content is fir wood chips with a calcium content of about 0.02 weight percent. Therefore, those skilled in the art will recognize that calcium content of the silicon formed in the present process can be controlled at least partially by proper selection of feed materials.

A calcium compound may be added as a source of calcium to the furnace either alone or in combination with other feed components. The calcium compound can be selected from a group consisting of calcium oxide, calcium carbonate, calcium fluoride, and the like. The calcium compound may be fed to the furnace as a solid material. The form of the solid calcium compound can be, for example, powder, granule, chip, pellet, flakes, particles, lumps, and briquettes. The calcium compound may also be fed as a water solution or slurry. This water solution or slurry can be fed by any conventional means for feeding liquids such as pumps, gravity feed, or gas-pressure feed.

The concentration of calcium within the silicon recovered from the furnace must be controlled within a range of about 0.4 to 2.0 weight percent. Preferred is when the concentration of calcium within the silicon recovered from the furnace is controlled within a range of about 0.5 to 1.0 weight percent. Controlling the calcium level within the desired ranges is effected by analyses of the starting raw materials and of the silicon recovered from the furnace and altering the feeds to maintain the desired concentration within the furnace. Analyses for calcium content of the feeds and recovered silicon can be by standard techniques known in the art such as spectrographic means. Control of the calcium concentration within the described ranges can be effected by selection of appropriate feed materials and by the addition of calcium compounds as previously described.

Recovery of silicon from the furnace can be effected by standard means, for example, by periodic or continuous tapping into a ladle or mold. If desired, the silicon may be refined by standard oxidative and slag-forming methods.

The present inventors have discovered that when the calcium concentration of the silicon is controlled within a range of about 0.4 to 2.0 weight percent, the carbon balance of the furnace in which the silicon is produced can be predicted by the yield of calcium from the furnace. More specifically, the inventors have found that a calcium yield of less than about 80 weight percent indicates a negative carbon balance in the furnace, a calcium yield greater than about 90 weight percent indicates an excess of carbon within the furnace, and a calcium yield within a range of about 80 weight percent to 90 weight percent indicates a furnace in carbon balance.

For purposes of the present invention "calcium yield" ($C_Y$) is defined as the weight percent of calcium in silicon recovered ($C_R$) from the furnace divided by the weight percent of calcium added ($C_A$) to the furnace as feed from all sources, the quotient multiplied by 100, i.e. $C_Y = C_R/C_A \times 100$.

The inventors believe that the ability of the calcium yield of the furnace to predict the carbon balance of the furnace is predicated by the following two reactions occurring in the furnace:

$$3SiC + CaO = CaC_2 + 3Si + CO, \quad (5)$$

and $$CaC_2 + 2SiO_2 + 2C = Ca + 2Si + 4CO \quad (6)$$

When there is a negative carbon balance in the furnace then a dicalcium silicate slag ($2CaO \cdot SiO_2$) forms reducing yield of calcium. When there is an excess of carbon in the furnace then excess silicon carbide is formed, which can push the electrode up in the furnace and effect heat and energy distribution within the furnace. When the furnace is in carbon balance the reactions described by equations (5) and (6) predominate and calcium is recovered in the silicon within the desired yield range of 80 weight percent to 90 weight percent. The carbon balance of the furnace is adjusted based on the calcium yield. The carbon balance is adjusted by altering the ratio of silicon dioxide to carbon source provided to the furnace. The amount of this alteration will depend upon the particular furnace and its operating conditions and can be easily ascertained by those familiar with the operation of such furnaces.

In a preferred embodiment of the present invention, the harmonic volts and the electrode consumption are monitored in conjunction with calcium yield to control the carbon balance of the furnace. The harmonic volts can serve as a leading indicator of carbon imbalance within the furnace while the electrode consumption can serve as a lagging indicator of carbon imbalance within the furnace.

Skreien, U. S. Pat. No. 3,909,242, issued Sep. 30, 1975, herein incorporated by reference, describes a method for determining operating conditions in electrical furnaces. Skreien teaches that the measured electrical parameter, harmonic volts, is the distortion of the electrode holder-to-furnace bottom voltage, or hearth voltage, as compared to the supplied grid voltage. The present inventors have discovered that the harmonic volts measurement can be a leading indicator to carbon imbalance within a silicon smelting furnace when used in conjunction with calcium yield measurements as previously described herein.

Specifically, when harmonic volts exceed a certain maximum, which may vary by furnace, more carbon is added if calcium yield is below 80 weight percent. Conversely, when harmonic volts are lower than a specified minimum, which may vary by furnace, carbon addition to the furnace is reduced if calcium yield is greater than 90 weight percent. In addition, as a lagging indicator, a furnace in carbon balance will maintain a electrode consumption below 100 kg per tonne of silicon produced. A furnace with a negative carbon balance will have greater electrode consumption.

The following example is provided to illustrate the improvements which can be realized in a silicon furnace when calcium yield is used as a means to control the carbon balance of the furnace. This example is not intended to limit the scope of the present claims.

EXAMPLE

A commercial 18 megawatt furnace equipped with three 1143 mm carbon electrodes connected to a three-phase AC 25 MVA transformer was operated for a two-month period without using calcium yield as an indicator of carbon balance in the furnace. During this period the silicon recovery was 76 percent, energy utilization was 13.5 mWh per tonne of silicon produced, and electrode consumption was 110 kg per tonne of silicon produced.

The furnace was then run using calcium yield as an indicator of carbon balance within the furnace. The calcium level within the silicon recovered was maintained within a range of 0.5 weight percent to 0.75 weight percent by adding limestone to the furnace as a feed, when required. The carbon balance of the furnace was periodically adjusted to keep the yield of calcium from the furnace within a range of about 80 weight percent to 90 weight percent. Over a four month period of operating the furnace in this mode, silicon recovery was 78.8 percent, energy utilization was 12.8 mWh per tonne of silicon produced, and electrode consumption was 93.5 kg per tonne of silicon produced.

We claim:

1. A method for controlling the carbon balance of a silicon smelting furnace, the method comprising:
   (A) providing to a furnace a mixture comprising silicon dioxide, a carbon source, and a calcium source,
   (B) providing energy to the furnace to effect carbothermic reduction of the silicon dioxide to silicon,
   (C) controlling calcium concentration within the silicon within a range of about 0.4 to 2.0 weight percent,
   (D) recovering silicon from the furnace,
   (E) determining yield of calcium in the recovered silicon to determine carbon balance in the furnace, where a calcium yield of less than about 80 weight percent indicates a negative carbon balance in the furnace, a calcium yield of greater than about 90 weight percent indicates an excess carbon balance in the furnace, and a calcium yield within a range of about 80 weight percent to 90 weight percent indicates a furnace in carbon balance,
   (F) measuring electrode consumption as a lagging indicator of carbon balance in the furnace, and
   (G) adjusting carbon balance of the furnace based upon the calcium yield and electrode consumption measurement.

2. A method according to claim 1 further comprising the measurement of harmonic volts as a leading indicator of carbon balance within the furnace.

3. A method according to claim 1, where energy is provided to the furnace by one or more submerged-arc carbon or graphite electrodes connected to an alternating current source.

4. A method according to claim 1, where the silicon dioxide is quartz.

5. A method according to claim 1, where the source of calcium comprises the silicon dioxide, the carbon source, and a calcium compound.

6. A method according to claim 1, where the calcium concentration within the silicon is controlled within a range of about 0.5 to 1.0 weight percent.

7. A method for controlling the carbon balance of a silicon smelting furnace, the method comprising:
   (A) providing to a furnace a mixture comprising quartz, a carbon source, and a calcium source where the calcium source comprises the quartz, the carbon source, and calcium oxide,
   (B) providing energy to the furnace by means of one or more carbon or graphite electrodes connect to an alternating current source to effect carbothermic reduction of the quartz to silicon,
(C) controlling calcium concentration within the silicon within a range of about 0.5 to 1.0 weight percent,
(D) tapping silicon from the furnace,
(E) determining yield of calcium in the tapped silicon to determine carbon balance of the furnace, where a calcium yield of less than about 80 weight percent indicates a negative carbon balance in the furnace, a calcium yield of greater than about 90 weight percent indicates an excess carbon balance in the furnace, and a calcium yield within a range of about 80 weight percent to 90 weight percent indicates a furnace in carbon balance,
(F) measuring harmonic volts of the furnace as a leading indicator of carbon balance in the furnace and measuring electrode consumption as a lagging indicator of carbon balance in the furnace, and
(G) adjusting carbon balance of the furnace base upon the calcium yield and harmonic volts measurement and electrode consumption measurement.

* * * * *